United States Patent
Lee et al.

(10) Patent No.: US 9,504,107 B2
(45) Date of Patent: Nov. 22, 2016

(54) BACKLIGHT UNIT AND DISPLAY DEVICE HAVING THE SAME

(71) Applicant: Samsung Display Co., Ltd., Yongin, Gyeonggi-Do (KR)

(72) Inventors: Woojin Lee, Asan-si (KR); Yu-chol Kim, Asan-si (KR); Yeong Won Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/614,289

(22) Filed: Feb. 4, 2015

(65) Prior Publication Data
US 2015/0382430 A1 Dec. 31, 2015

(30) Foreign Application Priority Data
Jun. 30, 2014 (KR) .................. 10-2014-0080930

(51) Int. Cl.
*H05B 33/08* (2006.01)
*H05B 37/04* (2006.01)

(52) U.S. Cl.
CPC .......... *H05B 33/0815* (2013.01); *Y02B 20/347* (2013.01)

(58) Field of Classification Search
CPC .......... H05B 33/0887; H05B 33/0848; H05B 33/0815; H05B 33/089; H05B 37/02; H05B 33/08; Y02B 20/341; H02M 3/155; H01L 33/00
USPC ........ 315/185 R, 209 R, 291, 307, 308, 122, 315/224, 247, 185 S, 312; 345/102
See application file for complete search history.

(56) References Cited

U.S. PATENT DOCUMENTS

| 8,274,237 | B2 | 9/2012 | Nagase et al. |
| 2008/0136394 | A1* | 6/2008 | Fukushi ................. H02M 1/32 323/285 |
| 2012/0262068 | A1 | 10/2012 | Chi et al. |
| 2013/0009976 | A1* | 1/2013 | Kim ..................... G09G 3/3406 345/547 |
| 2013/0293109 | A1 | 11/2013 | Cheon et al. |

FOREIGN PATENT DOCUMENTS

| JP | 4895854 | 1/2012 |
| JP | 2013-110059 | 6/2013 |
| KR | 10-2010-0098821 | 9/2010 |

* cited by examiner

*Primary Examiner* — Alexander H Taningco
*Assistant Examiner* — Renan Luque
(74) *Attorney, Agent, or Firm* — Innovation Counsel LLP

(57) ABSTRACT

A backlight unit includes a DC-DC converter that converts a first voltage to a second voltage in response to a driving pulse signal and a driving controller that outputs the driving pulse signal in response to an over-current control signal to control a reference voltage and a level of the second voltage. The driving controller controls the reference voltage in response to the over-current control signal such that the reference voltage increases prior to the second voltage by a predetermined time when the second voltage needs to be increased. In addition, the driving controller controls the reference voltage in response to the over-current control signal when the second voltage needs to be decreased such that the reference voltage decreases later than the second voltage by the predetermined time.

15 Claims, 7 Drawing Sheets

BACKLIGHT UNIT AND DISPLAY DEVICE HAVING THE SAME

CROSS-REFERENCE TO RELATED APPLICATION

This U.S. non-provisional patent application claims priority under 35 U.S.C. §119 to Korean Patent Application No. 10-2014-0080930, filed on Jun. 30, 2014, the contents of which are hereby incorporated by reference in its entirety.

BACKGROUND

1. Field of Disclosure

The present disclosure relates to a backlight unit and a display device having the same. More particularly, the present disclosure relates to a backlight unit capable of preventing an over-current malfunction thereof and a display device having the backlight unit.

2. Description of the Related Art

In general, a display device includes a display panel and gate and data drivers to drive the display panel. The display panel includes gate lines, data lines, and pixels connected to the gate lines and the data lines. The gate lines receive gate signals from the gate driver and the data lines receive data voltages from the data driver. The pixels receive the data voltages through the data lines in response to the gate signals provided through the gate lines. The pixels display gray-scales corresponding to the data voltages, and thus desired images are displayed.

The display device includes a backlight unit to supply light to the display panel. The backlight unit includes a cold cathode fluorescent lamp (CCFL) or a light emitting diode (LED) as its light source to generate the light.

Among them, the LED needs a converter driven by a direct-current voltage. That is, the backlight unit includes a DC-DC converter that receives a low direct-current voltage and outputs a high direct-current voltage. For instance, the direct-current voltage of about 15 volts to about 30 volts is converted to the direct-current voltage of about 100 volts to about 280 volts by the DC-DC converter. However, since the variation in voltage by the DC-DC converter is too big, a voltage stress applied to circuit parts included in the DC-DC convert becomes increase. As a result, an over-current occurs in the DC-DC converter and the DC-DC converter is damaged.

SUMMARY

The present disclosure provides a backlight unit capable of detecting an over-current phenomenon.

The present disclosure provides a display device having the backlight unit.

Embodiments of the inventive concept provide a backlight unit including a DC-DC converter that converts a first voltage to a second voltage in response to a driving pulse signal and a driving controller that outputs the driving pulse signal in response to an over-current control signal to control a reference voltage and a level of the second voltage. The driving controller controls the reference voltage in response to the over-current control signal such that the reference voltage increases prior to the second voltage by a predetermined time when the second voltage increases. The driving controller controls the reference voltage in response to the over-current control signal such that the reference voltage increases prior to the second voltage by a predetermined time when the second voltage needs to be increased, and the driving controller controls the reference voltage in response to the over-current control signal when the second voltage needs to be decreased such that the reference voltage decreases later than the second voltage by the predetermined time.

Embodiments of the inventive concept provide a display device including a display panel that displays an image and a backlight unit that supplies a light to the display panel. The backlight unit includes a DC-DC converter that converts a first voltage to a second voltage in response to a driving pulse signal and a driving controller that outputs the driving pulse signal in response to an over-current control signal to control a reference voltage and a level of the second voltage. The driving controller controls the reference voltage in response to the over-current control signal such that the reference voltage increases prior to the second voltage by a predetermined time when the second voltage needs to be increased, and the driving controller controls the reference voltage in response to the over-current control signal when the second voltage needs to be decreased such that the reference voltage decreases later than the second voltage by the predetermined time.

According to the above, a driving reliability of the display device is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
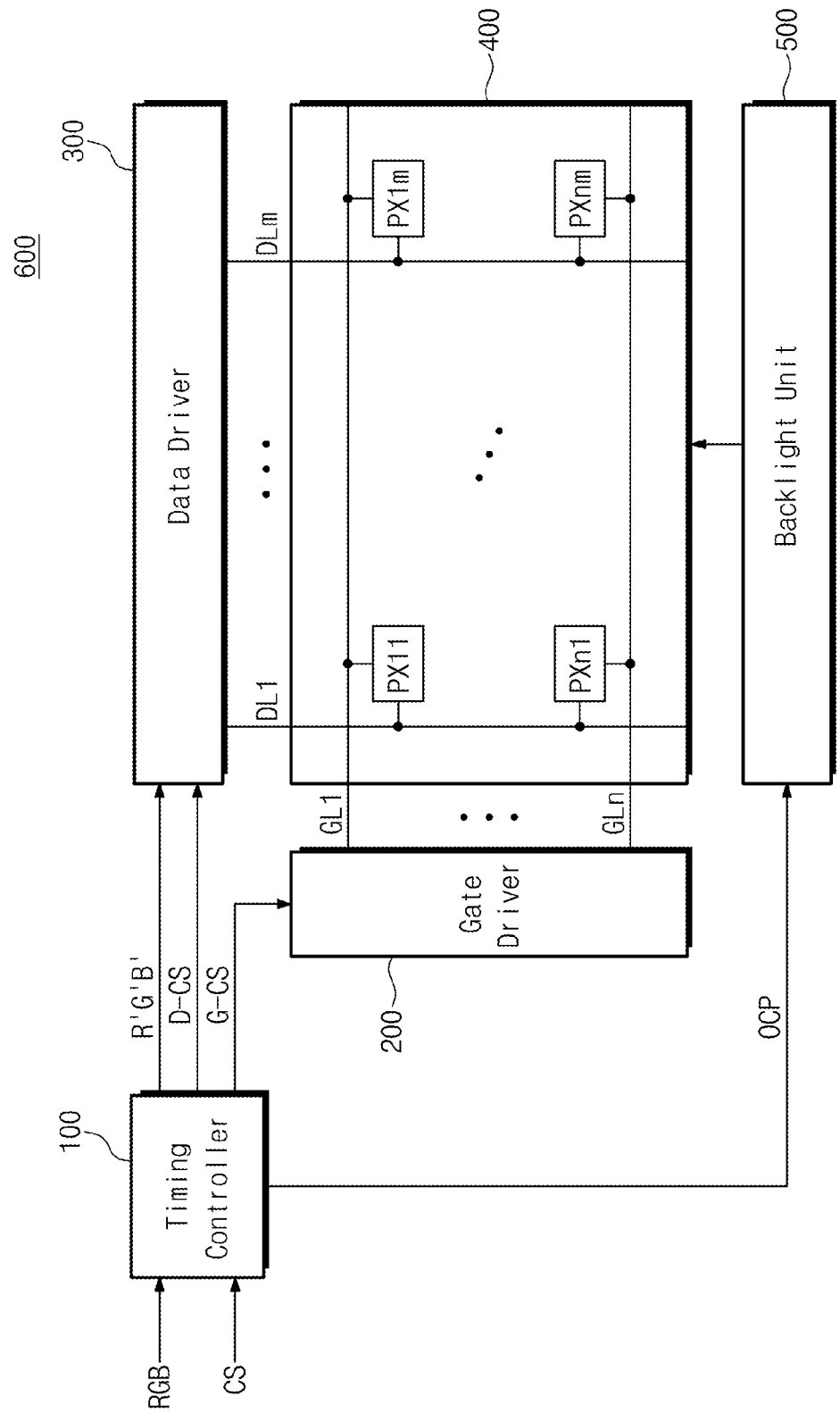
FIG. 1 is a block diagram showing a display device according to an exemplary embodiment of the present disclosure.

It will be understood that when one element or layer is referred to as being "on", "connected to" or "coupled to" another element or layer, the one element can be directly on, connected or coupled to the another element or layer, or intervening elements or layers may be present between the one element or layer and the another element or layer. In contrast, when one element or layer is referred to as being "directly on," "directly connected to" or "directly coupled to" another element or layer, there are no intervening elements or layers between the one element or layer and the another element or layer. Like numbers refer to like elements throughout a specification. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present inventive concept will be explained in detail with reference to the accompanying drawings.

FIG. 1 is a block diagram showing a display device 600 according to an exemplary embodiment of the present disclosure.

Referring to FIG. 1, the display device 600 includes a timing controller 100, a gate driver 200, a data driver 300, a display panel 400, and a backlight unit 500.

The timing controller 100 receives a plurality of image signals RGB and a plurality of control signals CS from the outside of the display device 600. The timing controller 100 converts a data format of the image signals RGB to a data format appropriate to an interface between the data driver 300 and the timing controller 100 and applies the converted image signals R'G'B' to the data driver 300.

The timing controller 100 generates a data control signal D-CS and a gate control signal G-CS in response to the control signals CS. The data control signal D-CS includes an output start signal and a horizontal start signal, and the gate control signal G-CS includes a vertical start signal and a vertical clock bar signal. The timing controller 100 applies the data control signal D-CS to the data driver 300 and applies the gate control signal G-CS to the gate driver 200.

According to the present exemplary embodiment, the timing controller 100 generates an over-current control signal OCP in response to an external image signal provided from an image board (not shown). The over-current control signal OCP has a signal level varied depending on the external image signal. That is, the over-current control signal OCP may be a signal that is used to check a voltage level required to drive the backlight unit 500 according to the external image signal. The timing controller 100 applies the over-current control signal OCP to the backlight unit 500.

The gate driver 200 generates the gate signals in response to the gate control signal G-CS provided from the timing controller 100. The gate driver 200 sequentially applies the gate signals to the display panel 400 through gate lines GL1 to GLn. Pixels PX11 to PXnm included in the display panel 400 are sequentially scanned by the gate signals one row at a time.

The data driver 300 converts the image signals R'G'B' to data voltages in response to the data control signal D-CS provided from the timing controller 100. The data driver 300 applies the data voltages to the display panel 400 through data lines DL1 to DLm.

The display panel 400 includes the gate lines GL1 to GLn, the data lines DL1 to DLm, and the pixels PX11 to PXnm.

The gate lines GL1 to GLn extend in a row direction to cross the data lines DL1 to DLm extending in a column direction. The gate lines GL1 to GLn are electrically connected to the gate driver 200 to receive the gate signals. The data lines DL1 to DLm are electrically connected to the data driver 300 to receive the data voltages. Each of the pixels PX11 to PXnm is connected to a corresponding gate line of the gate lines GL1 to GLn and a corresponding data line of the data lines DL1 to DLm.

The backlight unit 500 supplies light to the display panel 400. As an example, the backlight unit 500 includes one or more light emitting diodes. Meanwhile, a level of a voltage required to the backlight unit 500 is varied according to a driving condition of the display device 600. For instance, when the display device 600 displays a three-dimensional image, the backlight unit 500 requires the voltage level higher than that when the display device 600 displays a two-dimensional image.

To this end, the backlight unit 500 converts an input voltage provided from an external source (not shown) to the voltage used to drive the display device 600 using a DC-DC converter. However, when the high voltage is continuously output from the backlight unit 500, an over-current phenomenon may occur during the process of converting the input voltage provided from an external source to the voltage used to drive the display device 600. As a result, parts of the display device 600 may be damaged.

According to the present exemplary embodiment, the backlight unit 500 receives the over-current control signal OCP from the timing controller 100. The backlight unit 500 controls a voltage level of the reference voltage used to detect the over-current in response to the over-current control signal OCP.

Figure 2:
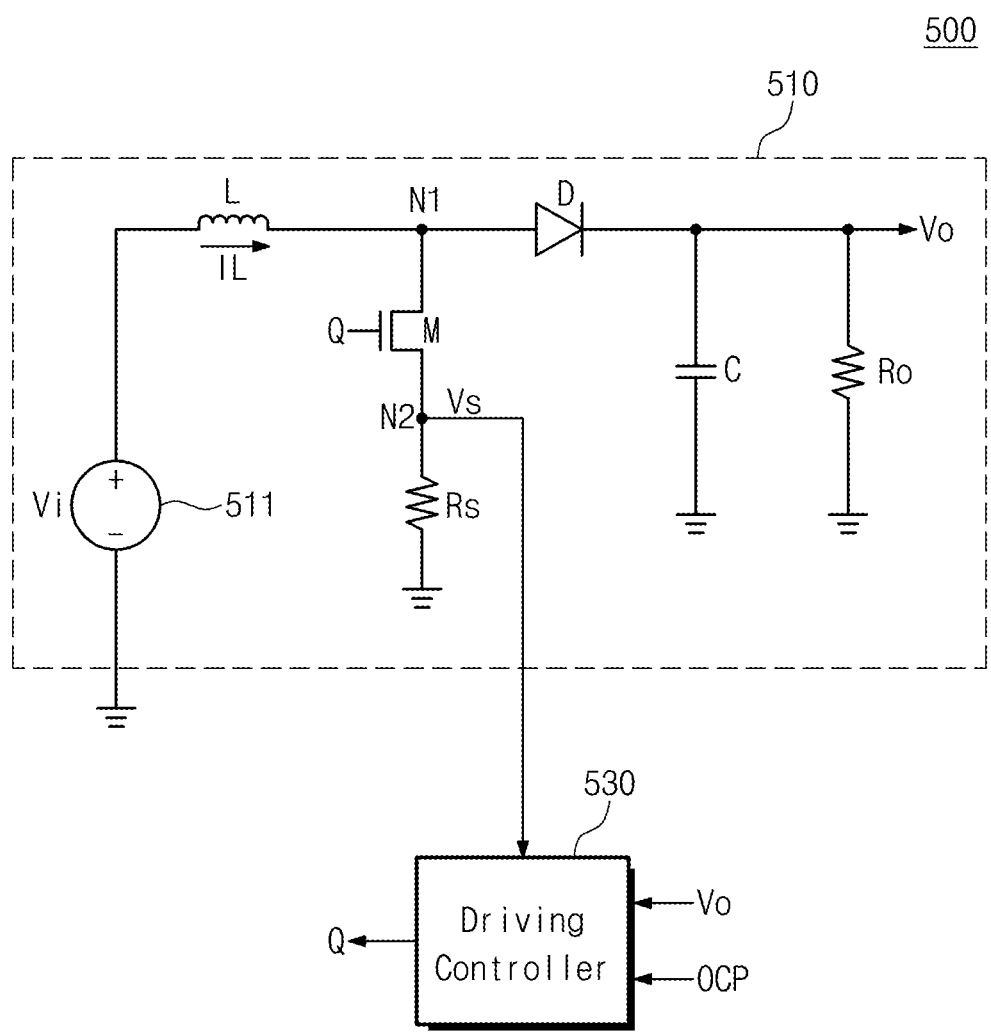
FIG. 2 is a circuit diagram showing a backlight unit shown in FIG. 1.

FIG. 2 is a circuit diagram showing the backlight unit 500 shown in FIG. 1.

Referring to FIG. 2, the backlight unit 500 includes a DC-DC converter 510 and a driving controller 530. The DC-DC converter 510 includes an input power supply 511, an inductor L, a driving transistor M, a diode D, a capacitor C, a driving resistor Rs, and an output resistor Ro. The DC-DC converter 510 converts the input voltage Vi to the output voltage Vo required to the drive of the backlight unit 500.

The input power supply 511 is connected between a ground terminal and one end of the inductor L. The input power supply 511 generates the input voltage Vi having a direct-current component.

The one end of the inductor L is connected to the input power supply 511 and the other end of the inductor L is connected to a first node N1. A current flows through the inductor L is changed in accordance with the operation of the driving transistor M.

The driving transistor M may be an NMOS transistor and connected between the first and second nodes N1 and N2. In detail, the driving transistor M includes a drain terminal connected to the first node N1, a source terminal connected to the second node N2, and a gate terminal connected to the driving controller 530. The driving transistor M is operated in response to a driving pulse signal Q provided from the driving controller 530.

When the driving transistor M is turned on in response to the driving pulse signal Q, the level of the driving current IL of the inductor L starts to increase according to the input voltage Vi. In this case, since the diode D is not turned on, the current flows through the inductor L is not output to the output terminal. That is, the current flows through the inductor L may flow to the second node N2 through the first node N1 and the driving transistor M. Here, since the diode D is not turned on, the current flows through the driving transistor M has the same level as that of the driving current IL. Hereinafter, the current flows through the driving transistor M when the driving transistor M is turned on is referred to as the driving current IL too because the current flows through the driving transistor M is the same as the current flows through the inductor L when the driving transistor M is turned on.

Accordingly, the level of the driving current IL flows through the inductor L may be substantially same as the level of the current flows through the second node N2 when diode is not turned on. As a result, a detection voltage Vs at the second node N2 is determined depending on the driving current IL and the driving resistor Rs. The output voltage Vo is determined depending on the voltage level of the capacitor C during the turn-on period of the driving transistor M that is turned on in response to the driving pulse signal Q.

On the contrary, when the driving transistor M is turned off in response to the driving pulse signal Q, the driving current IL flows through the inductor L is charged in the capacitor C through the diode D. In this case, the diode D is turned on and the level of the driving current IL of the inductor L starts to decrease. In addition, when the driving transistor M is turned off, a voltage level obtained by summing the input voltage Vi and the output voltage of the inductor L is applied to the first node N1. Therefore, the output voltage Vo is increased.

As described above, the DC-DC converter 510 may control the level of the output voltage Vo on the basis of the operation of the driving transistor M. For instance, when the display device 600 (refer to FIG. 1) displays the three-dimensional image, the display device 600 requires the voltage level higher than that when the display device 600 displays the two-dimensional image. In this case, the DC-DC converter 510 increases the turn-on time of the driving transistor M, and thus the level of the output voltage Vo is increased. This is because the level of the driving current IL of the inductor L is increased in accordance with the increase of the turn-on time of the driving transistor M.

The driving controller 530 receives the output voltage Vo and the over-current control signal OCP from the timing controller 100 (refer to FIG. 1). The driving controller 530 is electrically connected to the second node N2 to detect the detection voltage Vs of the second node N2. The driving controller 530 compares the detection voltage Vs and a predetermined reference voltage VP to check whether the driving current IL becomes higher than a reference value or not.

For instance, when the detection voltage Vs is higher than the reference voltage VP, the driving controller 530 generates a shut down signal to turn off the driving transistor M. The driving transistor M is turned off by the driving pulse signal Q during a period in which the shut down signal is activated. When the detection voltage Vs is higher than the reference voltage VP, the driving controller 530 controls a duty ratio of the driving pulse signal Q, thereby controlling the level of the driving current IL.

Figure 3:
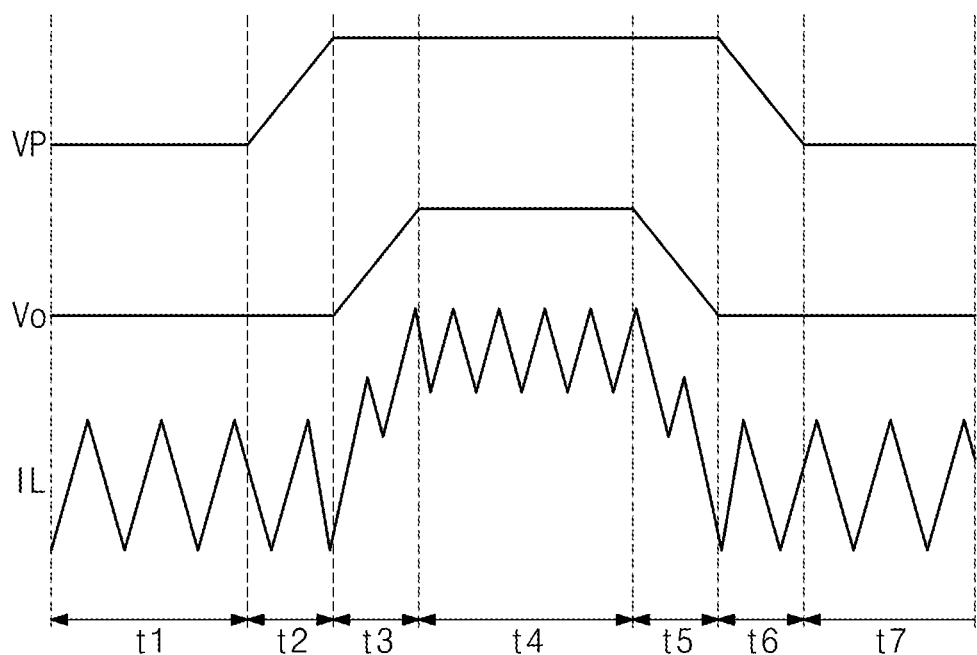
FIG. 3 is a graph showing a reference voltage as a function of an output voltage.

FIG. 3 is a graph showing a reference voltage VP as a function of an output voltage.

In FIGS. 2 and 3, the reference voltage VP and the output voltage Vo are shown in accordance with the driving current IL.

During first and second time periods t1 and t2, the driving pulse signal Q having a uniform duty ratio is applied to the driving transistor M from the driving controller 530. In this case, the driving transistor M is operated in response to the driving pulse signal Q having the uniform duty ratio, and thus the driving current IL of the inductor L repeatedly increases and decreases.

During the first time period t1, the reference voltage VP and the output voltage Vo are uniformly maintained by the driving controller 530. However, the driving controller 530 increases the level of the reference voltage VP during the second time period t2 in response to a high level of the over-current control signal OCP. When the output voltage Vo is increased prior to or together with the reference voltage VP, the over-current phenomenon may not be detected since the driving current IL increases to increase the output voltage Vo. Therefore, the driving controller 530 increases the reference voltage VP in response to the high level of the over-current control signal OCP prior to increasing the output voltage Vo.

Then, the driving controller 530 controls the duty ratio of the driving pulse signal Q to increase the output voltage Vo during a third time period t3. In detail, the driving controller 530 sets the duty ratio such that a pulse width of the driving pulse signal Q increases. Thus, a maximum level of the driving current IL flows through the inductor L becomes higher than a previous level, so that the output voltage Vo increases. The increased output voltage Vo and the increases reference voltage VP are maintained during a fourth time period t4.

That is, when the voltage required to drive the backlight unit 500 (refer to FIG. 1) increases or decreases, the timing controller 100 (refer to FIG. 1) applies the over-current control signal OCP corresponding to the required voltage to the backlight unit 500. For instance, when the image displayed through the display device 600 is changed to the three-dimensional image from the two-dimensional image, the timing controller 100 applies the over-current control signal OCP having the high level to the backlight unit 500 to increase the driving voltage of the backlight unit 500.

Then, during a fifth time period t5, the driving controller 530 controls the output voltage Vo in response to the over-current control signal OCP, and thus the output voltage Vo is decreased. In detail, the driving controller 530 sets the duty ratio of the driving pulse signal Q such that the pulse width of the driving pulse signal Q is decreased. Accordingly, the maximum level of the driving current IL which flows through the inductor L becomes lower than the previous level.

When the reference voltage VP decreases prior to or together with the output voltage Vo, the over-current phenomenon may be detected even when the backlight unit 500 is operated in a normal operation condition. Therefore, the driving controller 530 decreases the output voltage Vo in response to the low level of the over-current control signal OCP prior to decreasing the reference voltage VP. That is, the driving pulse signal Q is controlled on the basis of the low level of the over-current control signal OCP during the fifth time period t5. Thus, the driving current IL is decreased and the output voltage Vo is decreased.

Then, the driving controller 530 decreases the reference voltage VP during a sixth time period t6.

During a seventh time period t7, the decreased output voltage Vo and the decreased reference voltage VP are maintained.

As described above, the driving controller 530 controls the level of the output voltage Vo and the reference voltage VP in response to the over-current control signal OCP. The operation of the driving controller 530 will be described in detail with reference to FIG. 4.

Figure 4:
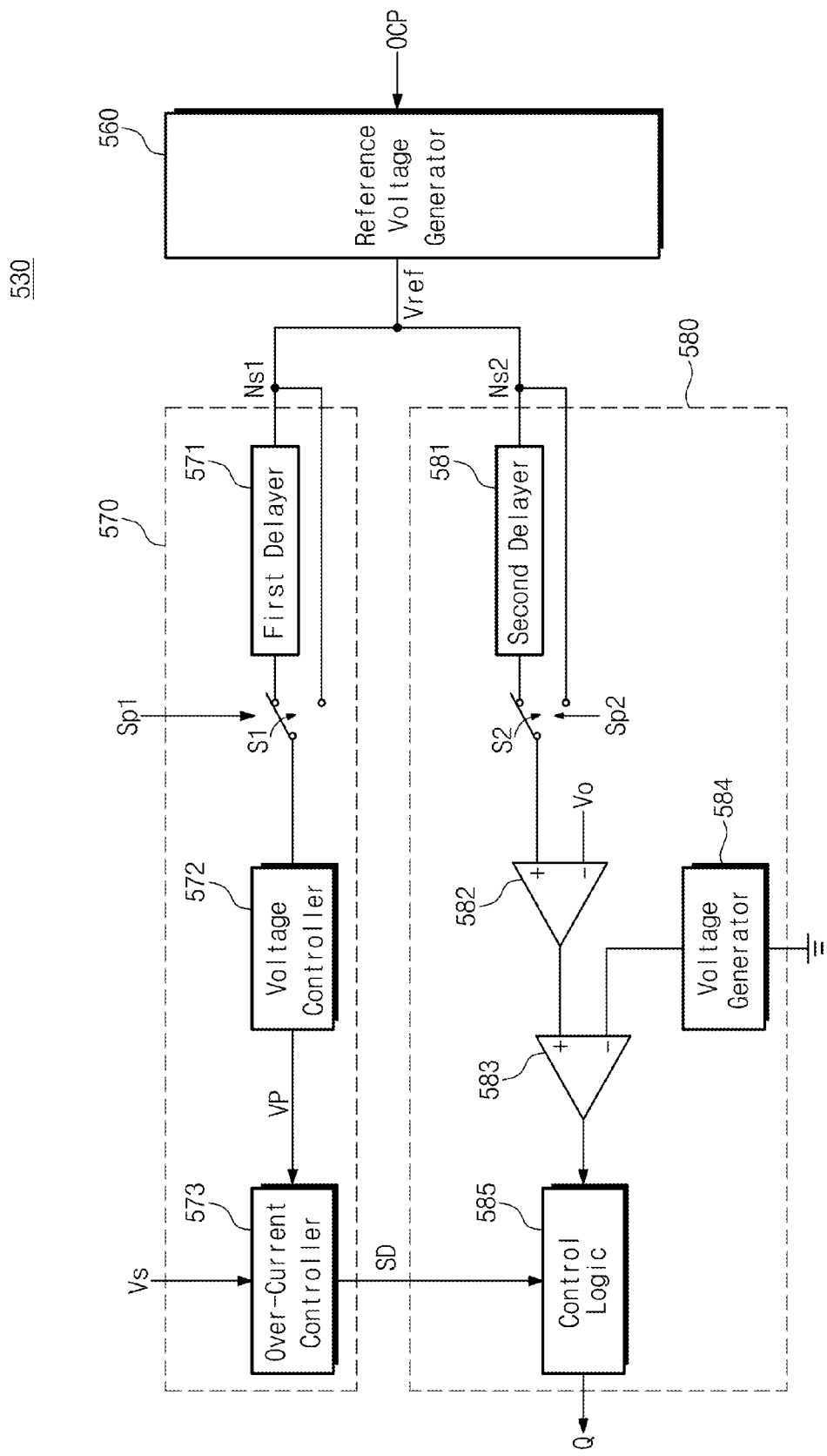
FIG. 4 is a block diagram showing a driving controller shown in FIG. 2.
Figure 5:
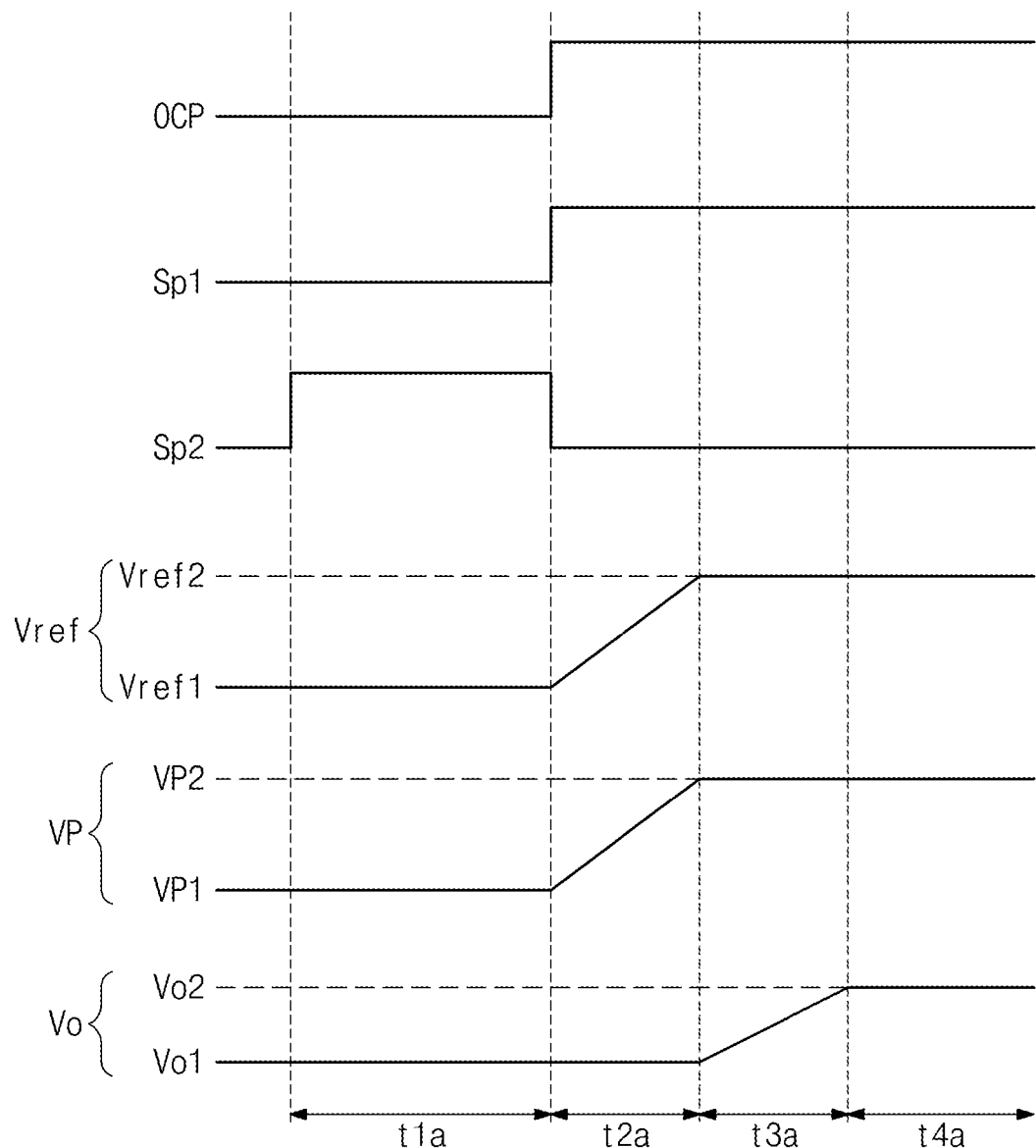
FIG. 5 is a timing diagram showing an operation of the driving controller according to an increase of the output voltage shown in FIG. 4.
Figure 6:
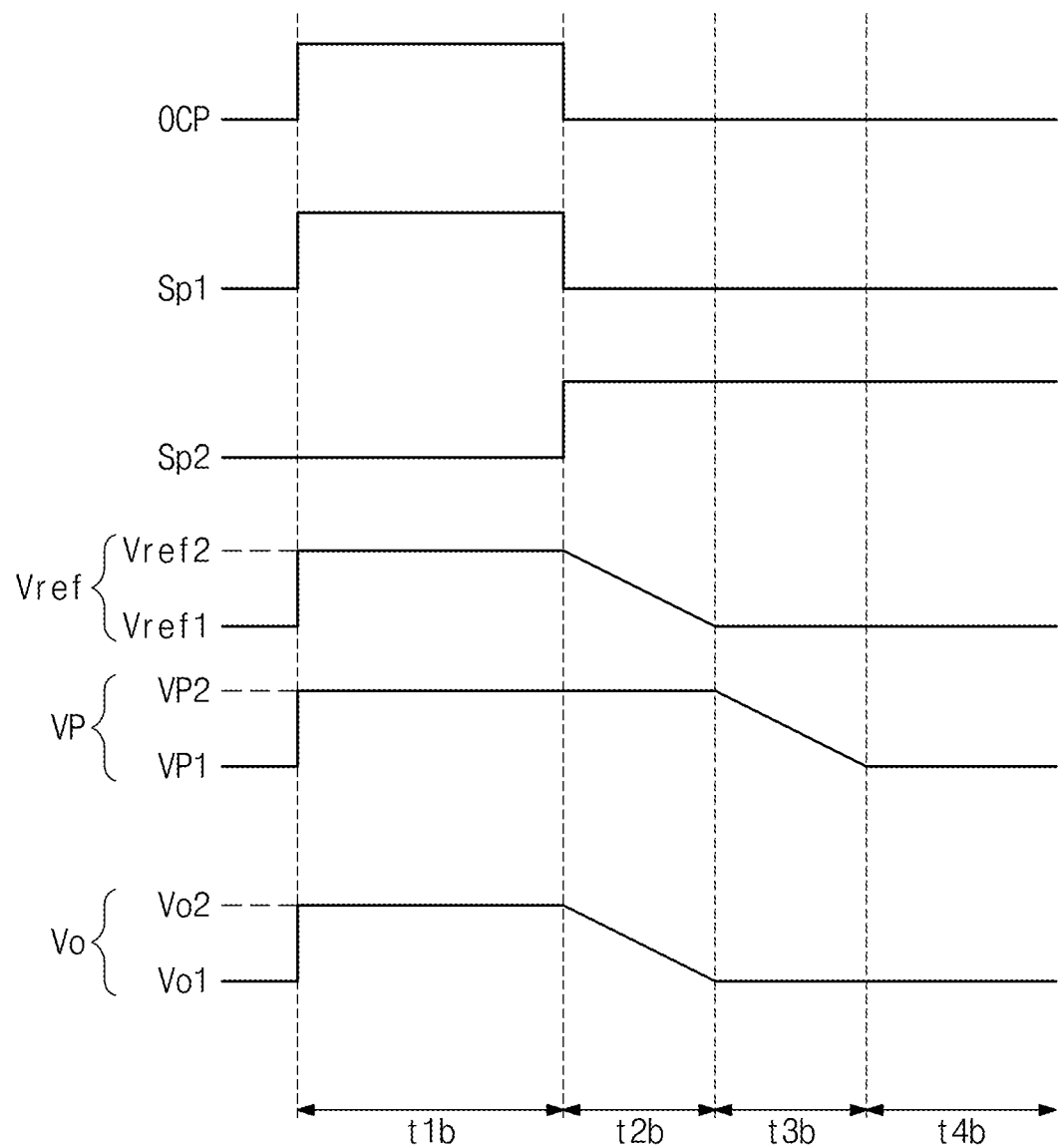
FIG. 6 is a timing diagram showing an operation of the driving controller according to a decrease of the output voltage shown in FIG. 4.

FIG. 4 is a block diagram showing the driving controller 530 shown in FIG. 2, FIG. 5 is a timing diagram showing the operation of the driving controller 530 according to the increase of the output voltage Vo shown in FIG. 4, and FIG. 6 is a timing diagram showing the operation of the driving controller 530 according to the decrease of the output voltage Vo shown in FIG. 4.

Referring to FIG. 4, the driving controller 530 includes a reference voltage generator 560, an over-current protection circuit 570, and an output controller 580.

The reference voltage generator 560 receives the over-current control signal OCP from the timing controller 100 (refer to FIG. 1). The reference voltage generator 560 outputs a reference output voltage Vref in response to the over-current control signal OCP.

The over-current protection circuit 570 includes a first delayer 571, a voltage controller 572, an over-current controller 573, and a first switch S1. The first delayer 571 delays the reference output voltage Vref output from the reference voltage generator 560 by a predetermined time. That is, the first delayer 571 delays the reference output voltage Vref by the predetermined time and applies the delayed reference output voltage Vref to the voltage controller 572 through the first switch S1.

The first switch S1 is operated in response to a first switching control signal Sp1. For instance, when the first switching control signal Sp1 is in a high level, one end of the first switch S1 is connected to the voltage controller 572 and the other end of the first switch S1 is connected to the first selection node Ns1. That is, when the first switching control signal Sp1 is in the high level, the reference output voltage Vref output from the reference voltage generator 560 is applied to the voltage controller 572 through the first switch S1 without delay.

On the contrary, when the first switching control signal Sp1 is in a low level, the one end of the first switch S1 is connected to the voltage controller 572 and the other end of the first switch S1 is connected to the first delayer 571. That is, when the first switching control signal Sp1 is in the low level, the reference output voltage Vref output from the reference voltage generator 560 is applied to the first delayer 571. The first delayer 571 delays the reference output voltage Vref applied to the voltage controller 572 by a predetermined time. After the predetermined time lapses, the reference output voltage Vref is applied to the voltage controller 572 through the first switch S1.

The voltage controller 572 divides the reference output voltage Vref provided through the first switch S1. The voltage controller 572 applies the divided reference voltage to the over-current controller 573. The voltage controller 572 may control the level of the reference voltage VP by dividing the reference output voltage Vref. That is, the divided reference voltage may be the reference voltage VP.

The over-current controller 573 receives the detection voltage Vs from the DC-DC converter 510 (refer to FIG. 2). As described with reference to FIG. 2, the detection voltage Vs is determined depending on the driving current IL and the driving resistor Rs. Also, the over-current controller 573 receives the reference voltage VP from the voltage controller 572.

The over-current controller 573 compares the detection voltage Vs and the reference voltage VP and then checks whether the over-current phenomenon occurs on the basis of the compared result.

For instance, when the detection voltage Vs is higher than the reference voltage VP, the over-current controller 573 decides that the over-current phenomenon occurs in the DC-DC converter 510. That is, when the detection voltage Vs is higher than the reference voltage VP, the driving current IL flows through the inductor L (refer to FIG. 2) becomes higher than a reference current value. Accordingly, the over-current controller 573 applies the shut down signal SD to a control logic 585. The control logic 585 outputs the driving pulse signal Q in response to the shut down signal SD to stop the operation of the driving transistor M (refer to FIG. 2).

The output controller 580 includes a second delayer 581, a first comparator 582, a second comparator 583, a voltage generator 584, the control logic 585, and a second switch S2. The second delayer 581 delays the reference output voltage Vref output from the reference voltage generator 560 by a predetermined time. The second delayer 581 applies the reference output voltage Vref, which is delayed by the predetermined time, to the first comparator 582 through the second switch S2.

The second switch S2 is operated in response to a second switching control signal Sp2. For instance, when the second switching control signal Sp2 is in the high level, one end of the second switch S2 is connected to a first terminal (+) of the first comparator 582 and the other end of the second switch S2 is connected to a second selection node Ns2. That is, when the second switching control signal Sp2 is in the high level, the reference output voltage Vref output from the reference voltage generator 560 is applied to the first terminal (+) of the first comparator 582 through the second switch S2 without delay.

On the contrary, when the second switching control signal Sp2 is in the low level, the one end of the second switch S2 is connected to the voltage controller 572 and the other end of the second switch S2 is connected to the second delayer 581. That is, when the second switching control signal Sp2 is in the low level, the reference output voltage Vref output from the reference voltage generator 560 is applied to the second delayer 581. The second delayer 581 delays the application of the reference output voltage Vref to the first comparator 582 by the predetermined time. After the predetermined time lapses, the reference output voltage Vref is applied to the first comparator 582 through the second switch S2.

The driving controller 530 may further include a switching controller (not shown) to output the first and second switching control signals Sp1 and Sp2. As an example, the switching controller may be realized by a pulse width modulation.

The first terminal (+) of the first comparator 582 is connected to the second switch S2 to receive the reference output voltage Vref. A second terminal (−) of the first comparator 582 receives the output voltage Vo from the DC-DC converter 510. The first comparator 582 compares the reference output voltage Vref and the output voltage Vo and applies a comparison voltage to a first terminal (+) of the second comparator 583 on the basis of the compared result. For instance, when the reference output voltage Vref is higher than the output voltage Vo, the first comparator 582 outputs a positive comparison voltage. When the reference output voltage Vref is lower than the output voltage Vo, the first comparator 582 outputs a negative comparison voltage.

The first terminal (+) of the second comparator 583 receives the comparison voltage from the first comparator 582. A second terminal (−) of the second comparator 583 receives the voltage output from the voltage generator 584. As an example, the voltage generator 584 outputs the voltage having a saw-tooth waveform. The second comparator 583 compares the comparison voltage and the saw-tooth waveform voltage and applies a comparison pulse signal to the control logic 585 according to the compared result. The operation of the second comparator 583 will be described in detail with reference to FIGS. 7 and 8.

The control logic 585 outputs the driving pulse signal Q in response to the comparison pulse signal output from the second comparator 583 to control the operation of the driving transistor M. For instance, when the driving pulse signal Q is in the high level, the control logic 585 turns on the driving transistor M. As a result, the driving current IL flows through the inductor L increases. As described with reference to FIG. 2, since the driving current IL increases, the output voltage Vo increases. In addition, the control logic 585 receives the shut down signal SD from the over-current controller 573. The control logic 585 changes the level of the driving pulse signal Q to the low level regardless of the level of the driving pulse signal Q during the period in which the shut down signal SD is provided. As a result, the driving transistor M is turned off and the driving current IL which flows through the inductor L is decreased.

Meanwhile, according to the present exemplary embodiment, the driving controller 530 is operated depending on levels of the over-current control signal OCP. For instance, the output voltage Vo increases in response to the high level of the over-current control signal OCP and the output voltage Vo decreases in response to the low level of the over-current control signal OCP.

Hereinafter, the operation of the driving controller 530 according to the increase of the output voltage Vo will be described in detail with reference to FIGS. 4 and 5.

Referring to FIGS. 4 and 5, the over-current control signal OCP is maintained in the low level during a first time t1a. In this case, the first switching control signal Sp1 has the low level and the second switching control signal Sp2 has the high level. Accordingly, the first switch S1 is connected to the first delayer 571 and the second switch S2 is connected to the second selection node Ns2. The reference voltage generator 560 outputs a first reference output voltage Vref1. In this case, the reference voltage VP and the output voltage Vo is not varied in response to the first reference output voltage Vref1, but it should not be limited thereto or thereby. That is, the voltage level of the reference voltage VP and the output voltage Vo may be decreased in response to the first reference output voltage Vref1.

The level of the over-current control signal OCP is rising to the high level from the low level during a second time t2a. In this case, the reference voltage generator 560 increases the reference output voltage Vref from a first reference output voltage Vref1 to a second reference output voltage Vref2. In addition, the first switching control signal Sp1 is rising to the high level from the low level and the second switching control signal Sp2 is falling to the low level from the high level. In this case, the first switch S1 is connected to the first selection node Ns1 and the voltage controller 572 and the second switch S2 is connected to the second delayer 581 and the first comparator 582.

That is, the second reference output voltage Vref2 output from the reference voltage generator 560 is applied to the first switch S1 of the over-current protection circuit 570 and the second delayer 581 of the output controller 580. As a result, the second reference output voltage Vref2 applied to the second switch S2 is more delayed by the predetermined time than the second reference output voltage Vref2 applied to the first switch S1. Accordingly, the over-current protection circuit 570 increases the reference voltage VP from the first reference voltage VP1 to the second reference voltage VP2 in response to the second reference output voltage Vref2 during the second time t2a. In this case, the output voltage Vo does not increase.

During a third time ta3, the second reference output voltage Vref2 output from the second delayer 581 is applied to the first comparator 582 through the second switch S2. The output controller 580 outputs the comparison pulse signal in response to the second reference output voltage Vref2 to increase the output voltage Vo. The control logic 585 generates the driving pulse signal Q in response to the comparison pulse signal. The DC-DC converter 510 increases the output voltage Vo from the first output voltage Vo1 to the second output voltage Vo2 in response to the driving pulse signal Q.

When the reference voltage VP is increased later than the output voltage Vo or together with the output voltage Vo, the over-current phenomenon may be detected even when the backlight unit 500 is operated in a normal operation condition. Therefore, when the output voltage Vo needs to be increased, the reference voltage is increased prior to increasing the output voltage Vo.

In a fourth time ta4, the voltage level of the reference voltage VP and the output voltage Vo is not changed until the over-current control signal OCP is falling to the low level from the high level.

Hereinafter, the operation of the driving controller 530 according to the decrease of the output voltage Vo will be described in detail with reference to FIG. 6.

Referring to FIG. 6, the over-current control signal OCP is maintained in the high level during a first time t1b. In this case, the first switching control signal Sp1 has the high level and the second switching control signal Sp2 has the low level. Accordingly, the first switch S1 is connected to the first selection node Ns1 and the second switch S2 is connected to the second delayer 581. The reference voltage generator 560 outputs the second reference output voltage Vref2. In this case, the voltage level of the reference voltage VP and the output voltage Vo is not changed in response to the second reference output voltage Vref2.

The over-current control signal OCP is falling to the low level from the high level during a second time t2b. In this case, the reference voltage generator 560 starts to decrease the reference output voltage Vref from the second reference output voltage Vref2 to the first reference output voltage Vref1. In addition, the switching control signal Sp1 is falling to the low level from the high level and the second switching control signal Sp2 is rising to the high level from the low level. In this case, the first switch S1 is connected to the first delayer 571 and the voltage controller 572 and the second switch S2 is connected to the first terminal (+) of the first comparator 582 and the second selection node Ns2.

That is, the first reference output voltage Vref1 output from the reference voltage generator 560 is applied to the first delayer 571 and the first comparator 582. As a result, the first reference output voltage Vref1 applied to the first switch S1 is more delayed than the first reference output voltage Vref1 applied to the second switch S2 by the predetermined time. The predetermined time corresponds to a second time t2b. Therefore, responsive to the first reference output voltage Vref1, the output controller 580 outputs the comparison pulse signal to decrease the output voltage Vo during the second time t2b. The control logic 585 generates the driving pulse signal Q in response to the comparison pulse signal. The DC-DC converter 510 decreases the output voltage Vo from the second output voltage Vo2 to the first output voltage Vo1 in response to the driving pulse signal Q.

During a third time t3b, the over-current protection circuit 570 decreases the reference voltage VP from the second reference voltage VP2 to the first reference voltage VP1 in response to the first reference output voltage Vref1. When the reference voltage VP is decreased faster than or together with the output voltage Vo, the over-current phenomenon may be detected even when the backlight unit is in the normal operation condition. Accordingly, the reference voltage VP is decreased later than the output voltage Vo when the output voltage Vo needs to be decreased.

In a fourth time t4b, the voltage level of the reference voltage VP and the output voltage Vo is not changed until the over-current control signal OCP is rising to the high level from the low level.

In the above-mentioned description, the first and second reference output voltages Vref1 and Vref2 are output from the reference voltage generator 560, but they should not be limited thereto or thereby. That is, the reference voltage generator 560 may generate various reference voltages in response to the over-current control signal OCP.

As described above, the backlight unit 500 according to the present exemplary embodiment may control the reference voltage VP on the basis of the variation of the output voltage Vo.

Figure 7:
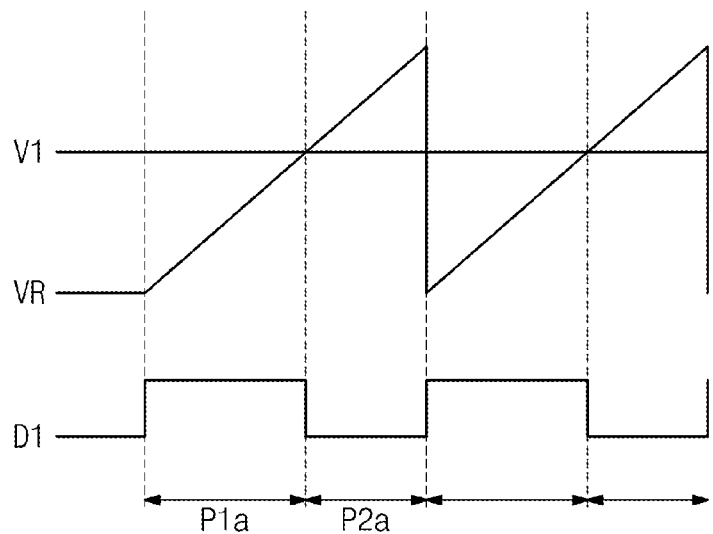
FIG. 7 is a timing diagram showing an example of an operation of a second comparator shown in FIG. 4.

FIG. 7 is a timing diagram showing an example of the operation of the second comparator shown in FIG. 4.

Referring to FIGS. 4 and 7, the first comparator 582 compares the output voltage Vo and the reference output voltage Vref. Here, the reference output voltage Vref is higher than the output voltage Vo. The first comparator 582 outputs a first comparison voltage V1 according to its compared result.

The second comparator 583 receives the first comparison voltage V1 through the first terminal (+). In addition, the second comparator 583 receives the saw-tooth waveform voltage VR output from the voltage generator 584 through the second terminal (−). The second comparator 583 compares the first comparison voltage V1 and the saw-tooth waveform voltage VR and outputs a first comparison pulse signal D1 according to the compared result.

In more detail, the second comparator 583 outputs the first comparison pulse signal D1 having the high level during a period in which the first comparison voltage V1 is higher than the saw-tooth waveform voltage VR. The second comparator 583 outputs the first comparison pulse signal D1 having the low level during a period in which the first comparison voltage V1 is smaller than the saw-tooth waveform voltage VR. That is, the first comparison pulse signal D1 has a duty ratio determined by a first pulse width P1a having the high level and a second pulse width P2a having the low level. The control logic 585 applies the driving pulse signal corresponding to the first comparison pulse signal D1 to the gate terminal of the driving transistor M.

In this case, the DC-DC converter 510 (refer to FIG. 2) increases the output voltage Vo. In detail, the driving transistor M is turned on during the high level of the first comparison pulse signal. Since the first pulse width P1a is longer than the second pulse width P2a, the turn-on period of the driving transistor M may be longer than the turn-off period of the driving transistor M. Accordingly, the period in which the driving current IL (refer to FIG. 2) increases is longer than the period in which the driving current IL decreases. As a result, the output voltage Vo increases.

Figure 8:
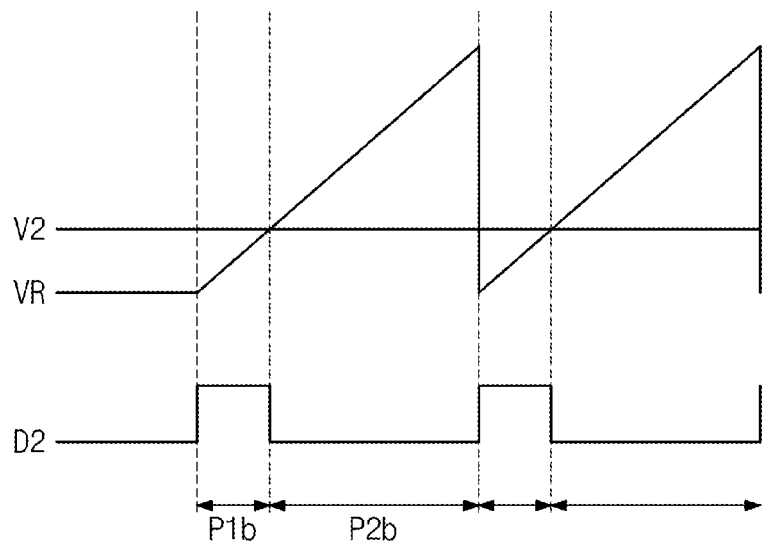
FIG. 8 is a timing diagram showing another example of an operation of a second comparator shown in FIG. 4.

FIG. 8 is a timing diagram showing another example of the operation of the second comparator shown in FIG. 4.

Referring to FIGS. 4 and 8, the first comparator 582 compares the output voltage Vo and the reference voltage Vref. Here, the reference output voltage Vref is lower than the output voltage Vo. The first comparator 582 outputs a second comparison voltage V2 according to its compared result.

The second comparator 583 receives the second comparison voltage V2 through the first terminal (+) thereof. In addition, the second comparator 583 receives the saw-tooth waveform voltage VR output from the voltage generator 584 through the second terminal (−) thereof. The second comparator 583 compares the second comparison voltage V2 and the saw-tooth waveform voltage VR and outputs a second comparison pulse signal D2 according to the compared result.

In more detail, the second comparator 583 outputs the second comparison pulse signal D2 having the high level during a period in which the second comparison voltage V2 is higher than the saw-tooth waveform voltage VR. The second comparator 583 outputs the second comparison pulse signal D2 having the low level during a period in which the second comparison voltage V2 is lower than the saw-tooth waveform voltage VR. That is, the second comparison pulse signal D2 has a duty ratio determined by a first pulse width P1b having the high level and a second pulse width P2b having the low level. The control logic 585 applies the driving pulse signal corresponding to the second comparison pulse signal D2 to the gate terminal of the driving transistor M.

In this case, the DC-DC converter 510 (refer to FIG. 2) decreases the output voltage Vo. Since the first pulse width P1b is shorter than the second pulse width P2b, the turn-on period of the driving transistor M may be shorter than the turn-off period of the driving transistor M. Accordingly, the period in which the driving current IL (refer to FIG. 2) increases is shorter than the period in which the driving current IL decreases. As a result, the output voltage Vo decreases.

As described above, the backlight unit 500 controls the duty ratio of the driving pulse signal to control the operation of the driving transistor M in accordance with the variation of the output voltage Vo.

Meanwhile, when the reference output voltage Vref is smaller than the output voltage Vo, the first comparator 582 outputs a negative comparison voltage. In this case, the second comparator 583 outputs the comparison pulse signal having the low level.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed.

What is claimed is:

1. A backlight unit comprising:
a DC-DC converter that converts a first voltage to a second voltage in response to a driving pulse signal; and
a driving controller that outputs the driving pulse signal to control a level of the second voltage and controls a reference voltage in response to an over-current control signal,
wherein the driving controller comprises:
a reference voltage generator that generates a reference output voltage in response to the over-current control signal,
an over-current protection circuit that controls the reference voltage in response to the reference output voltage, and
an output controller that outputs a comparison pulse signal in response to the reference output voltage to decide a duty ratio of the driving pulse signal, and
wherein the driving controller controls the reference voltage in response to the over-current control signal such that the reference voltage increases prior to the second voltage by a predetermined time when the second voltage is increased, and the driving controller controls the reference voltage in response to the over-current control signal when the second voltage is decreased such that the reference voltage decreases later than the second voltage by the predetermined time.

2. The backlight unit of claim 1, wherein the DC-DC converter comprises:
an input power supply that generates the first voltage;
an inductor disposed between the input power supply and a first node;
a driving transistor disposed between the first node and a second node and operated in response to the driving pulse signal; and
a resistor disposed between the second node and a ground terminal, a detection voltage at the second node being determined depending on a current flowing through the driving transistor and the resistor.

3. The backlight unit of claim 2, wherein the driving controller receives the detection voltage at the second node.

4. The backlight unit of claim 2, wherein the driving controller compares the detection voltage and the reference voltage and generates a shut down signal according to the compared result to turn off the driving transistor.

5. The backlight unit of claim 4, wherein the driving pulse signal is maintained in a low level in response to the shut down signal.

6. The backlight unit of claim 1, wherein the over-current control signal comprises a first level and a second level.

7. The backlight unit of claim 6, wherein the reference output voltage comprises first and second reference output voltages, and the reference voltage generator outputs the first reference output voltage in response to the first level of the over-current control signal and outputs the second reference output voltage in response to the second level of the over-current control signal.

8. The backlight unit of claim 7, wherein the second reference output voltage has a level higher than a level of the first reference output voltage.

9. The backlight unit of claim 1, wherein the over-current protection circuit comprises:
a first switch operated in response to a first switching control signal;
a first delayer connected to the first switch and the reference voltage generator to delay the reference output voltage output from the reference voltage generator by a predetermined time and to apply the delayed reference output voltage to the first switch in response to a first level of the first switching control signal;
a voltage controller that receives the reference output voltage through the first switch and divides the reference output voltage; and
an over-current controller that applies a shut down signal to a control logic in response to the reference voltage and a detection voltage of the DC-DC converter.

10. The backlight unit of claim 9, wherein the first switch is connected to the reference voltage generator and the voltage controller in response to a second level of the first switching control signal to apply the reference output voltage to the voltage controller.

11. The backlight unit of claim 9, wherein the output controller comprises:
a second switch operated in response to a second switching control signal;
a second delayer connected to the second switch and the reference voltage generator to delay the reference output voltage output from the reference voltage generator by a predetermined time and to apply the delayed reference output voltage to the second switch in response to a first level of the second switching control signal;
a first comparator that receives the reference output voltage through the second switch and the second voltage from the DC-DC converter to output a comparison voltage; and
a second comparator that compares the comparison voltage output from the first comparator and a saw-tooth waveform voltage, the second comparator outputting the comparison pulse signal according to the compared result of the comparison voltage and the saw-tooth waveform voltage.

12. The backlight unit of claim 11, wherein the output controller further comprises a voltage generator to output the saw-tooth waveform voltage and the second comparator generates the comparison pulse signal having a high level when the comparison voltage is higher than the saw-tooth waveform voltage.

13. The backlight unit of claim 11, wherein the second switch is connected to the reference voltage generator and the first comparator in response to a second level of the second switching control signal to apply the reference output voltage to the first comparator.

14. A display device comprising:
a display panel that displays an image; and
a backlight unit that supplies a light to the display panel, the backlight unit comprising:
a DC-DC converter that converts a first voltage to a second voltage in response to a driving pulse signal; and a driving controller that outputs the driving pulse signal to control a level of the second voltage and controls a reference voltage in response to an over-current control signal, wherein the driving controller comprises:
- a reference voltage generator that generates a reference output voltage in response to the over-current control signal,
- an over-current protection circuit that controls the reference voltage in response to the reference output voltage, and
- an output controller that outputs a comparison pulse signal in response to the reference output voltage to decide a duty ratio of the driving pulse signal, and wherein the driving controller controls the reference voltage in response to the over-current control signal such that the reference voltage increases prior to the second voltage by a predetermined time when the second voltage is increased, and the driving controller controls the reference voltage in response to the over-current control signal when the second voltage is decreased such that the reference voltage decreases later than the second voltage by the predetermined time.

15. The display device of claim 14, further comprising a timing controller to generate the over-current control signal, wherein the DC-DC converter controls the output voltage in response to the over-current control signal.

* * * * *